UNITED STATES PATENT OFFICE.

NELSON H. MOSHER, OF EAU CLAIRE, WISCONSIN.

ARTIFICIAL STONE.

SPECIFICATION forming part of Letters Patent No. 362,851, dated May 10, 1887.

Application filed October 8, 1886. Serial No. 215,697. (No specimens.)

*To all whom it may concern:*

Be it known that I, NELSON H. MOSHER, a citizen of the United States, and a resident of Eau Claire, in the county of Eau Claire and State of Wisconsin, have invented certain new and useful Improvements in Artificial Stone; and I do declare the following to be a full, clear, and exact description of the invention, such as will enable others skilled in the art to which it appertains to make and use the same.

My invention relates to artificial stone designed for paving and building purposes; and it consists of a dry mixture of Portland or other good cement, two parts; sand, gravel, or broken stone, or these combined, six parts. To each barrel of the above, mixed, add and mix, dry, one peck of a mixture of one part of calcined lime and two parts of plaster-of-paris. Mix together dry.

The above mixture should be thoroughly saturated with either one of the following: Two parts gum-shellac and one part litharge, mixed with an alkaline solution by boiling, using as weak an alkaline solution as possible to dissolve the gums. This solution is to be mixed with water in the proportions of about one part of the solution to thirty parts of water; or the solution may be made of two parts of shellac to one part of black oxide of manganese, mixed with an alkaline solution in the same proportions; or two parts shellac and one part rosin, dissolved as above and mixed in the same proportions; or a solution of rosin dissolved in alkali by boiling, and using one part of the dissolved solution to about ten parts of water, as above. The object of using the litharge, manganese or rosin with shellac is to rapidly dry the made stone. By using rosin alone it acts as a cement and also as a drier. It is also an aid to the shellac as a cement to repel water from the stone after being made.

The stone from the paste thus made can be formed into all shapes for building, piping, paving, and all other purposes for which stone is used.

The stone is formed by tamping or compressing in any other manner the paste so made into molds. Coloring-matter may be also added to the solution to give any desired color to the composition to imitate the color of the natural stone.

The stone is of a grayish tint when finally set and dry.

The molds for the stone should be so made as to be taken apart for most forms.

Tiling may be pressed out of the molds.

The stone should be taken from the mold as soon as made, and laid aside to dry.

The block of stone will season more uniformly by being daily sprinkled or wet with water for a few days.

Stone made by using either of the solutions will be ready for use in a short time, and will become harder by age and exposure. It makes a durable and cheap stone, and from artistic molds pleasing designs for ornamenting brick, stone, or other buildings can be made. The proportions of the ingredients should be changed as coarser or finer materials are used, and calcined lime can be omitted altogether.

Having described this invention, what I claim, and desire to secure by Letters Patent, is—

1. An artificial stone having as ingredients gum-shellac and litharge mixed with an alkaline solution by boiling, substantially as specified.

2. An artificial stone having as ingredients gum-shellac and rosin mixed with an alkaline solution, also with the paste from which the block is formed, substantially as specified.

3. An artificial stone composed of Portland or other good cement, sand, gravel, or broken stone and plaster-of-paris, mixed dry, and then mixed with a solution of gum-shellac and litharge and alkali by boiling, and then mixed with water in the proportion of one part of the composition to thirty parts of water, substantially as specified.

In testimony whereof I affix my signature in presence of two witnesses.

NELSON H. MOSHER.

Witnesses:
J. F. ELLIS,
H. D. COOLEY.